United States Patent [19]

Jauch

[11] Patent Number: 4,557,166
[45] Date of Patent: Dec. 10, 1985

[54] AUTOMATIC MULTIPLE WORKPIECE TURNING MACHINE

[76] Inventor: Kurt Jauch, Schillerstrasse 1, D-7445 Bempflingen, Fed. Rep. of Germany

[21] Appl. No.: 465,396

[22] Filed: Feb. 10, 1983

[30] Foreign Application Priority Data

Feb. 12, 1982 [DE] Fed. Rep. of Germany ....... 3204886
Jan. 18, 1983 [DE] Fed. Rep. of Germany ....... 3301475

[51] Int. Cl.$^4$ ...................... B23B 13/04; B23B 15/00; B23B 3/34
[52] U.S. Cl. ........................................... 82/3; 82/2.5; 408/45; 29/38 C; 10/89 R
[58] Field of Search ............................. 82/3, 2 R, 2.5; 29/38 B, 38 C, 35.5, 33 J; 408/45; 10/87, 89 R, 107 PH; 901/6, 8; 414/736

[56] References Cited

U.S. PATENT DOCUMENTS

| 860,937 | 7/1907 | Reilly | 10/130 R |
| 1,984,176 | 12/1934 | Cone | 29/38 B |
| 2,080,157 | 5/1937 | Yager et al. | 29/38 B |
| 2,128,186 | 8/1938 | Jones | 29/38 C |
| 2,236,349 | 3/1941 | Gish | 29/38 B |
| 2,779,956 | 2/1957 | Butler et al. | 29/38 B |
| 2,886,836 | 5/1959 | Moeltzner | 29/38 B |

FOREIGN PATENT DOCUMENTS

| 2346762 | 3/1975 | Fed. Rep. of Germany | 408/45 |
| 2816222 | 10/1979 | Fed. Rep. of Germany | 29/38 B |

Primary Examiner—Lowell A. Larson
Assistant Examiner—William E. Terrell
Attorney, Agent, or Firm—Karl W. Flocks; Sheridan Neimark; A. Fred Starobin

[57] ABSTRACT

A work turret is rotated by steps around a central axis with a first group of a multiplicity of clamping devices formed to clamp one side of a workpiece each facing a charging device for feeding in workpieces, and a second group of clamping devices on the side of the work turret averted from the charging device formed to clamp the machined end of a workpiece each. A gripper can be moved to and fro between the two sides of the work turret by which partially machined workpieces are removed from the clamping device of the first group and turned to be clamped in the clamping devices of the second group.

8 Claims, 8 Drawing Figures

AUTOMATIC MULTIPLE WORKPIECE TURNING MACHINE

FIELD OF THE INVENTION

This invention relates to an automatic multiple workpiece turning machine having a work turret which is rotatable by steps around a central axis, a charging device for feeding in workpieces, a multiplicity of clamping devices which are disposed on the work turret around and parallel to the central axis, said clamping devices facing the charging device and each being developed to clamp one side of one of the workpieces (32) as taken over from said charging device, machining devices which are disposed around the central axis in a multiplicity of stations, and a work transfer arrangement, by means of which partially machined workpieces are removed from the clamping devices, then transferred so as to be clamped at their machined ends and subsequently machined at the end which was previously clamped.

BACKGROUND OF THE INVENTION

In a known automatic turning machine of this kind, the work transfer means is equipped with a revolving unit which revolves a partially machined workpiece, removed from one of the clamping devices, and inserts the machined end of said workpiece into the same clamping device once again. In order that this clamping device be in a position to clamp the workpiece at the end which has a reduced diameter due to the preceding machining, a reducing sleeve is pushed into the clamping device from the rear before the workpiece is once again inserted into said clamping device, and furthermore an adjustable stop for the workpiece is introduced into the clamping device, likewise from the rear, in order to secure the clamping position of said clamping device in an axial direction.

In these known automatic turning machines, the revolving unit connected with the work transfer means requires considerable construction expenditure and space; the same is true of devices which are required for the automatic insertion and withdrawal of the reducing sleeves and stops. The arrangement of clamping devices exclusively on the side of the work turret which faces the charging device also means that all machining devices must be disposed in the neighbourhood of this one side of the work turret, which can lead to considerable space problems.

It is true that automatic turning machines are also known as in German Patent-Auslegeschrift 1552 250, which have a pair of clamping jaws on each of a multiplicity of clamping devices disposed on the periphery of a work turret, said clamping jaws clamping a workpiece in its middle area in order that both ends be machined simultaneously by machining devices disposed on both sides of the work turret. However, in this case, a workpiece partially machined during a first revolution of the work turret cannot be clamped in another position for additional machining of its middle area on a second revolution of the work turret. If such an additional machining is necessary, the workpiece must be passed to a clamping device which is independent of the work turret.

SUMMARY OF THE INVENTION

It is, therefore, an object of this invention to further develop an automatic turning machine of the type described at the outset so that workpieces can be clamped on one and the same work turret and in varying positions according to the stage in machining.

Another object of the invention is that the construction costs be minimized for the devices which are required to turn and reclamp workpieces which have been machined on one side, and for the operating mechanisms for such devices.

These and other objects are met by the invention in that clamping devices are disposed on the side of the work turret which is averted from the charging device, said clamping devices are each formed to clamp the machined end of one workpiece, the work transfer means is adapted to be moved to and fro between transfer positions on both sides of the work turret.

In accordance with the present invention, a differentiation is made between a first group of clamping devices, which are disposed on a first side of the work turret facing the charging device and exclusively serve a one-sided machining of the workpieces during a first revolution of the work turret, and a second group of clamping devices which are disposed on a second side of the work turret, averted from the charging device and the clamping devices of the first group, and exclusively serving the further machining of the workpieces already machined on one side. The clamping devices of the first group are adapted to and will remain adapted to the original dimensions of the workpieces as long as these are manufactured or machined in a certain form or size; the clamping devices of the second group accordingly, are adapted to and will remain adapted to the dimensions which result only upon machining of the workpieces clamped in the clamping devices of the first group. This adaption can, apart from the clamping diameter of the clamping devices, also apply to a stop which may be disposed in each single clamping device to determine the axial position of the clamped workpieces. The known reducing sleeves and stops which can be inserted and withdrawn from the clamping devices are thus dispensable. The construction and operation of the automatic turning machines according to the invention are simplified by this alone. Furthermore, inaccuracies which are unavoidable when using reducing sleeves no longer apply. A further simplification results in the automatic turning machines according to the invention in that a relatively simple work transfer means without a revolving unit suffices for transferring the workpieces each from one clamping device of the first group to one clamping device of the second group.

According to a further development of the invention, the clamping devices averted from the charging device are disposed in gaps between the clamping devices facing the charging device. In this way, clamping devices can be accommodated on a work turret of a given diameter in a number which is twice as large as in the case of the known automatic turning machine described at the outset without the total thickness of the work turret being necessarily larger than the total axial length of each single clamping device.

According to a modified embodiment of the invention, the clamping devices averted from the charging device are each disposed coaxially with one clamping device facing the charging device.

In the automatic turning machines according to the invention, just as in the known automatic turning machines described at the outset, the clamping devices on either side of the work turret can have a collet each which may be radially compressed in a resilient manner by axial displacement of a clamping sleeve in which it is enclosed. In this case, the invention can be developed further in that the clamping devices averted from the charging device differ from the clamping devices facing the charging device only in that the collets have a smaller inner diameter.

Furthermore, and likewise conforming with the known automatic turning machines of this type, the collets can each comprise an hydraulically operable piston and, dependent on the position of the work turret, can be connected to pressure medium canals in a control pivot which is disposed coaxially with the work turret. In such a case, in accordance with a further advantageous feature of the invention, an additional pressure medium canal in the control pivot is associated with the collets of the clamping devices averted from the charging device.

Also, in known manner, an adjustable stop can be disposed on each clamping device for the workpiece to be clamped. In accordance with the invention, this feature can be further developed in that the stop on each clamping device averted from the charging device is formed as a hollow guide for a means to expel finished workpieces. Compressed air, above all, is suited as means for the expelling, or a push rod which can be moved backwards and forwards may be used.

A particularly simple construction of the work transfer means and its operation results if the work transfer means has at least one gripper which may be tilted around and displaced along an outer axis, said outer axis being parallel to the central axis.

The invention is preferably developed further in that a first gripper is adapted to be moved to and fro between a first transfer position on the side of the work turret facing the charging device and a second transfer position radially outside the work turret and a second gripper is adapted to be moved to and fro between a third transfer position which is adjacent to said second transfer position, and a fourth transfer position on the side of the work turret which is averted from the charging device.

This further development is advantageously combined with the tiltable arrangement of the grippers such that the two grippers are each fixed to one gripper shaft and the two gripper shafts are in mutual alignment.

For a better understanding of the invention reference may be made to the following description of exemplary embodiments, taken in conjunction with the figures of the accompanying drawings.

DESCRIPTION OF THE EMBODIMENTS

Figure 1:
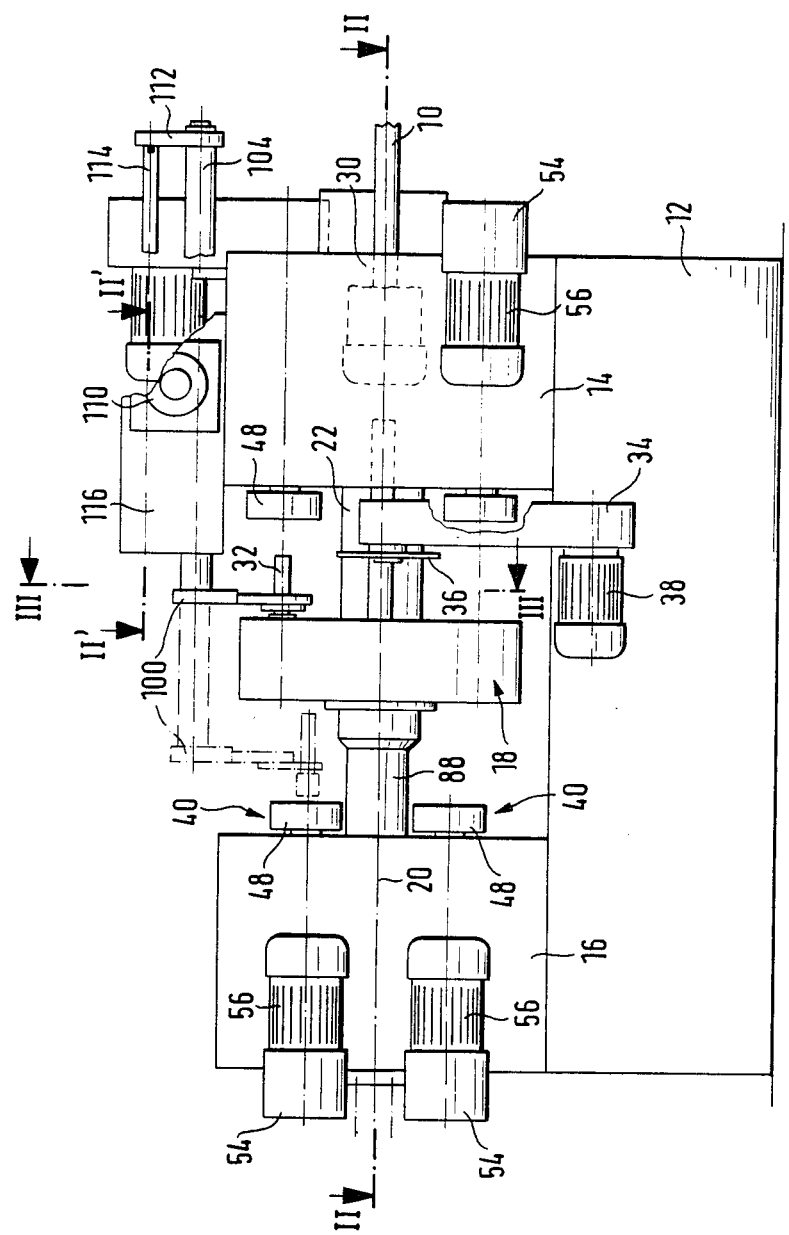
FIG. 1 is a front elevational view of an automatic turning machine.

The automatic turning machine here represented has the task of machining rod-shaped or rolled-up and subsequently straightened annular stock 10 by turning and, as the case may be drilling, milling and the like. The automatic turning machine has a bench 12 on which a first head stock 14 and a second head stock 16 are fixed. In a space between the two head stocks 14 and 16, a work turret 18 is disposed which may be rotated by steps around a central axis 20, said central axis 20 being horizontal in the example represented.

The work turret 18 is integral with or fixed on a central shaft 22, and said central shaft is supported in the first headstock 14 and may be driven via a worm drive 24 by a motor—not shown—which is disposed in the first head stock. On the end of the central shaft 22 remote from the work turret 18, a flange 26 is formed with concentric, conical bores with which are associated with an hydraulically operable conical pin 28 for arresting the work turret 18 in predetermined angular positions.

A charging or feeding device 30 in the first head stock 14 feeds the stock 10 by steps corresponding to the length of the workpieces 32 which are to be manufactured therefrom. This charging device 30 is of normal construction and therefore not described in detail.

Between the charging device 30 and the work turret 18, a severing device 34 is situated on the first head stock 14 and may be tilted in seesaw motion around a horizontal axis. To the severing device 34 belongs a circular saw 36 which also has a horizontal axis and can be driven by a motor 38.

Figure 2:
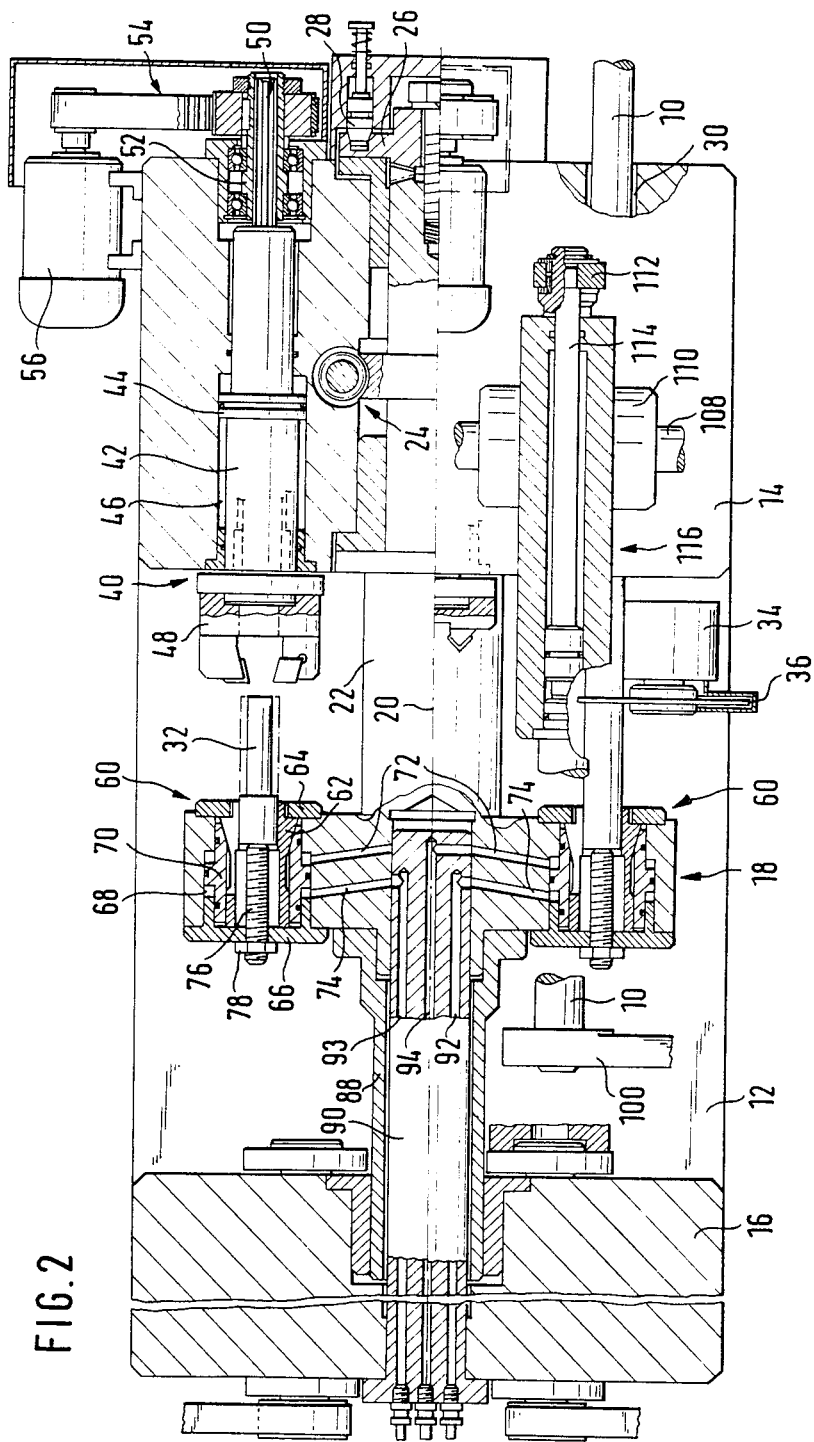
FIG. 2 is a section taken in the central horizontal plane II—II and partially in the higher horizontal plane II'—II' of FIG. 1.

A multiplicity of machining devices 40 is disposed on both head stocks 14 and 16, said machining devices being identical or at least similar to each other—for which reason only the machining device 40 on the first head stock 14 as depicted in the axial section in FIG. 2 is described in detail.

The machining device 40 has a spindle 42 which is parallel to the central axis 20 and is situated in the associated head stock 14 so as to be rotatable and axially slidable. A piston 44 is constructed on the spindle 42 and separates two chambers in a cylinder bore 46 of the head stock 14 from each other so that the spindle 42 can be axially adjusted by means of a controlled supply of a pressure medium to these two chambers and can be locked in each of its positions. The spindle 42 carries a tool holder 48 on its end facing the work turret 18 and this tool holder 48 is equipped with one or several turning tools and/or a drill or milling tool. On the end of the spindle 42 which is remote from the work turret 18, a shaft journal 50 is fixed which is connected by splines to a bushing 52. The bushing 52 which is rotatable in the associated head stock 14, is however, fixed so as to be unslidable axially and can be driven via a toothed belt drive 54 by a motor 56.

On the work turret 18, a multiplicity of clamping devices 60 are disposed parallel to the central axis 20 at identical angular distances. As shown in FIGS. 1 to 4, four such clamping devices 60 are provided and thus the angle between them is 90°. Each of the clamping devices 60 has a collet 62 which has several slits and the exterior of which has a partially truncated cone shape and is held between a thrust ring 64 and a lid 66 so as to be axially unslidable. The thrust ring 64 and the lid 66 are bolted to the work turret 18 and close a stepped cylinder bore 68 in which a clamping sleeve 70 is carried so as to be axially slidable. The clamping sleeve 70 encloses the collet 62 and has an inner surface which is complementary to the truncated cone shape of the collet's outer surface so that the collet 62 can be compressed radially by sliding the clamping sleeve 70 in the direction of the thrust ring 64 in order to clamp one of the workpieces 32 at its unmachined end. The exterior of the clamping sleeve 70 has a piston-like construction so that it divides the cylinder bore 68 into two chambers which are connected to a front radial canal 72 and a rear radial canal 74 respectively. An adjustable stop 76 in the form of a thread bolt is screwed into the lid 66 and is secured by a nut 78 in a predetermined position.

The four clamping devices 60, as described, open on to the side of the work turret 18 which faces the charging device 30. These clamping devices 60 are all provided to clamp a workpiece 32—sawn off from a rod-shaped stock 10—at the end which is still unmachined. These clamping devices are designated as clamping devices of a first group. Between each pair of clamping devices 60 of the first group on the work turret 18 is disposed a clamping device 80 of a second group. The clamping devices 80 of the second group each have a collet 82 which differs from the collets 62 only in that it has a smaller inner diameter and is inversely disposed in the capstan 18, that is, with its end provided to receive a workpiece 32 averted from the charging device 30.

The stepped cylinder bore 68 associated with each clamping device 80 is disposed inversely, corresponding to the arrangement of the associated collets 82, as in the case of the clamping devices 60. A front radial canal 84 and a rear radial canal 86—in relation to the arrangement of the clamping devices 80—open out into the cylinder bore 68 of each of these clamping devices.

Furthermore, the clamping devices 80 of the second group conform with those of the first group; thus, they each have a thrust ring 64, a lid 66, a cylinder bore 68, a clamping sleeve 70 and a stop 76 in the form of a thread bolt, with a nut 78 for fastening the stop. The stop 76, at each of the clamping devices 80 at least, is drilled to form a hollow which does not necessarily need to be the case in the stops 76 of the clamping devices 60. In the second head stock 16, a central hollow shaft 88 is situated which is flanged on to the work turret 18 and receives a control pivot 90 which is fixed in the second head stock 16. The control pivot 90 has a multiplicity of axial canals—five canals 92 to 96 are shown—which can be supplied with oil under pressure via a valve—not shown—and are connected to the radial canals 72, 74, 84 and 86 such that the clamping devices 60 and 80 can be opened and closed selectively.

Figure 3:
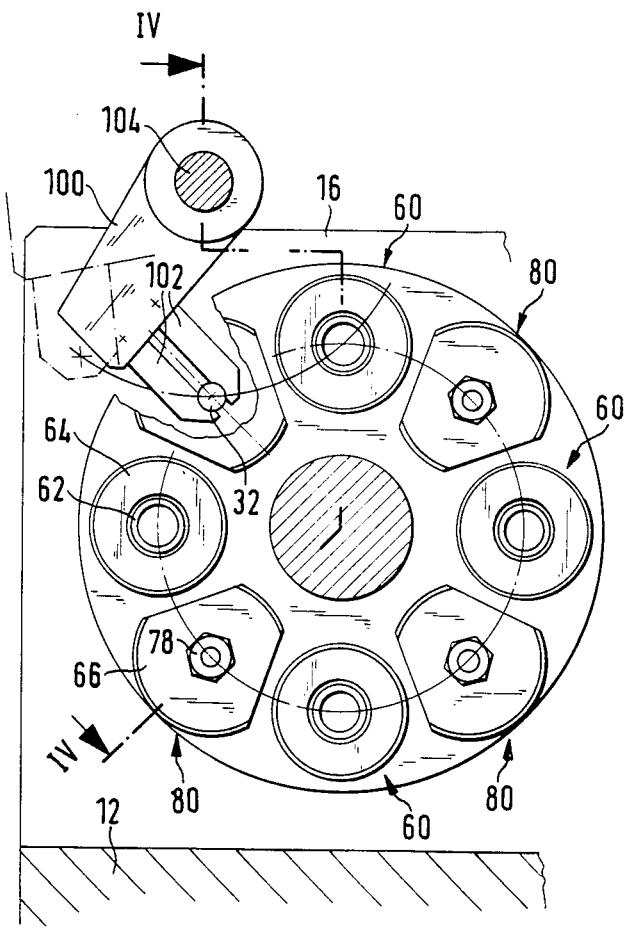
FIG. 3 is a section taken in the vertical plane III—III of FIG. 1.

The valves are, for example, so connected and the connections between the axial and radial canals arranged such that when the work turret 18 is in the position shown in FIG. 3, the left clamping device 60 is temporarily open in order to receive a workpiece 32 which will then be cut from the stock 10 after closure of said clamping device. During this, the clamping devices 60 at the bottom and the right of FIG. 3 are closed in order each to hold a workpiece 32; the clamping device at the top of FIG. 3 is temporarily open so that a workpiece machined on one side can be removed therefrom. In corresponding manner, the clamping device 80 at the left of the top of FIG. 3 is temporarily open so that a workpiece 32 machined on one side can be inserted at its machined end; the clamping devices 80 to the left and right at the bottom are, on the other hand, closed. The clamping device 80 to the right of the top is temporarily open so that a completed machined workpiece 32 can be expelled therefrom, whether by introducing a push rod—not depicted—or by blowing in compressed air through the axial bore of the associated stop 76.

A gripper 100 is provided for transferring the workpieces 32 from the clamping device 60 at the top of FIG. 3 to the clamping device 80 at the top left, and said gripper has a pair of movable jaws 102 and is fixed on one end of a gripper shaft 104 arranged in parallel to the central axis 20. The gripper shaft 104 is journalled in the first head stock 14, so as to be axially slidable and rotatable and has splines of a toothing 106 of great length which meshes with a toothed rack 108, said toothed rack being guided slidably and transversely of the gripper shaft 104 in the first head stock 14. The toothed rack 108 is an extension of the piston rod of an hydraulic or pneumatic piston-cylinder unit whose actuation causes a tilting of the gripper 100 in the one or the other direction. The end of the gripper shaft 104 remote from the gripper 100 rests in a plate 112 which is fixed to one end of a piston rod 114, said piston rod 114 being concentric with the gripper shaft and belonging to a further hydraulic or pneumatic piston-cylinder unit 116. By actuating the piston-cylinder unit 116, the gripper 100 is slidable axially and optionally in the one or the other direction.

Figure 4:
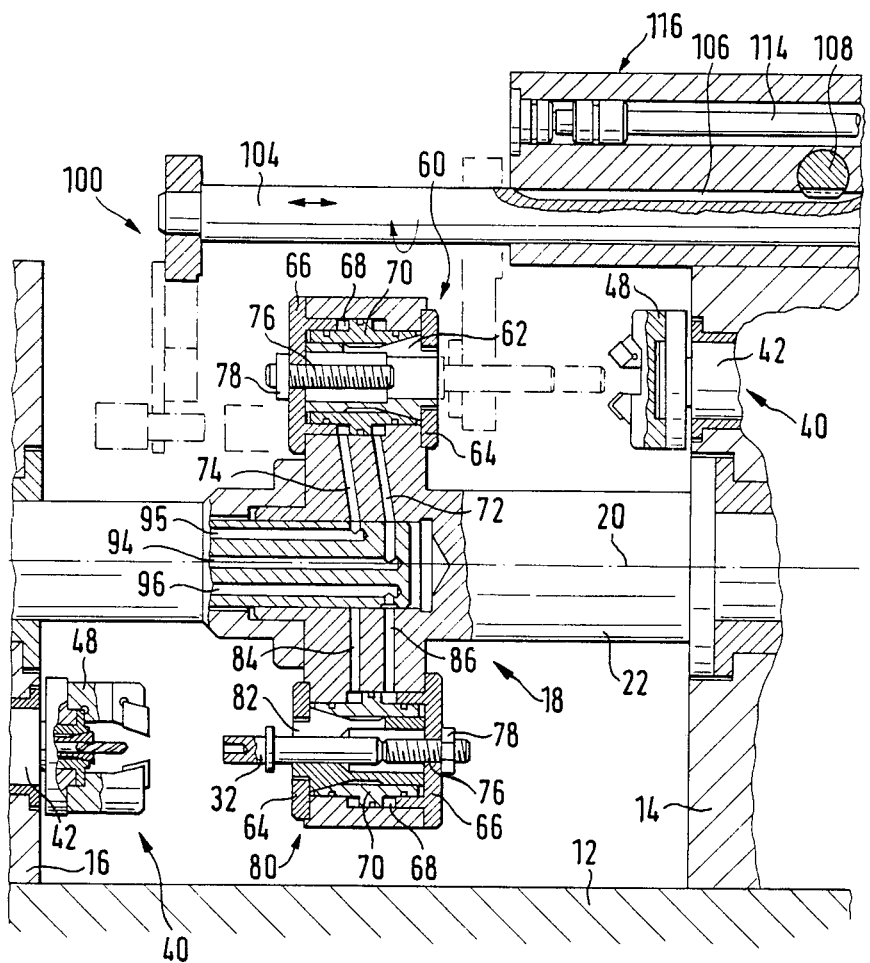
FIG. 4 is a section taken in the plane IV—IV of FIG. 3.

The gripper 100 is thus in a position to extract a workpiece 32, which has been machined on one side from one of the clamping devices 60 of the first group and to insert this workpiece by tilting and axial sliding of the gripper into one of the clamping devices 80, as is represented in FIGS. 3 and 4 in the example of the transport of the workpiece from the clamping device 60, which, for the moment is at the top, to the clamping device 80 which is at the top left.

In the embodiment according to FIGS. 1 to 4, the thickness of the work turret 18, measured in radial direction, corresponds to the total axial length of each of the clamping devices 60 and 80. In the example depicted, the staggered arrangement of the clamping devices 60 on the one hand and the clamping devices 80 on the other hand, at 45° from each other, results in a space-saving and weight-economical construction of the work turret 18.

Figure 5:
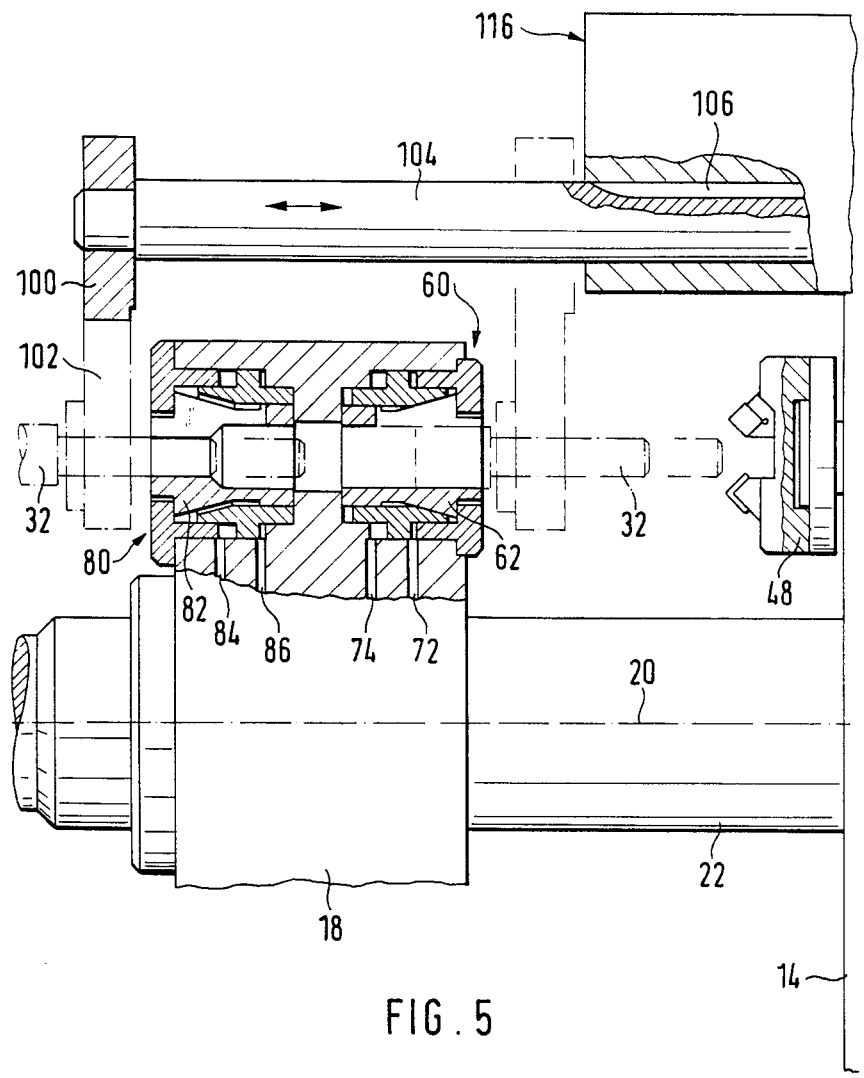
FIG. 5 is a modified embodiment in a cross sectionional elevation corresponding to the upper portion of FIG. 4.

In the embodiment, shown in FIG. 5, for transferring a workpiece 32 between one of the clamping devices 60 and the clamping device 80 in alignment therewith, the gripper 100 has to carry out shorter tilting movements but, on the other hand, a rather greater axial displacement than in the embodiment according to FIGS. 1 to 4.

Figure 6:
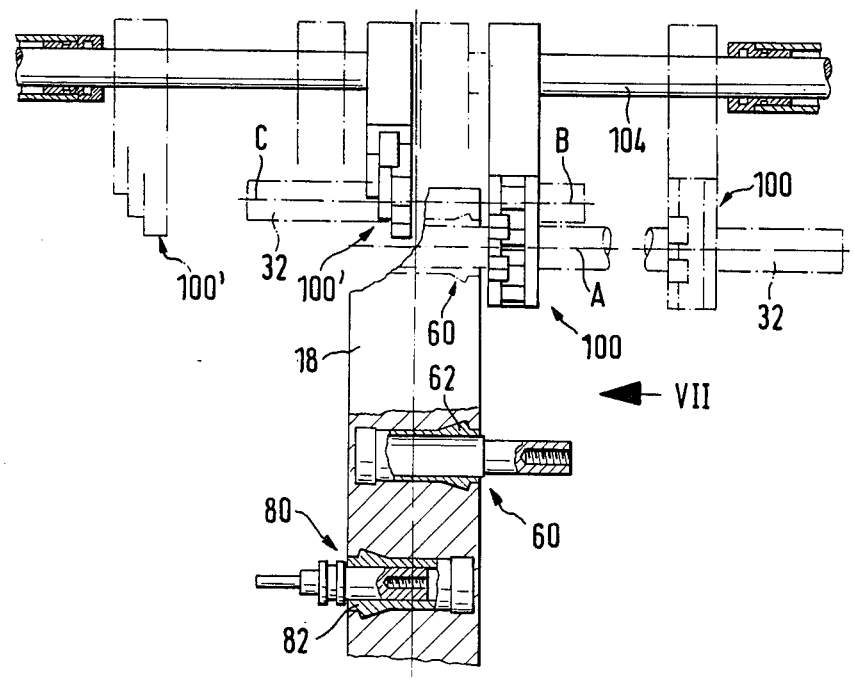
FIG. 6 is a further modified embodiment, likewise in a cross sectionional elevation corresponding to the upper portion of FIG. 4.
Figures 7, 8:
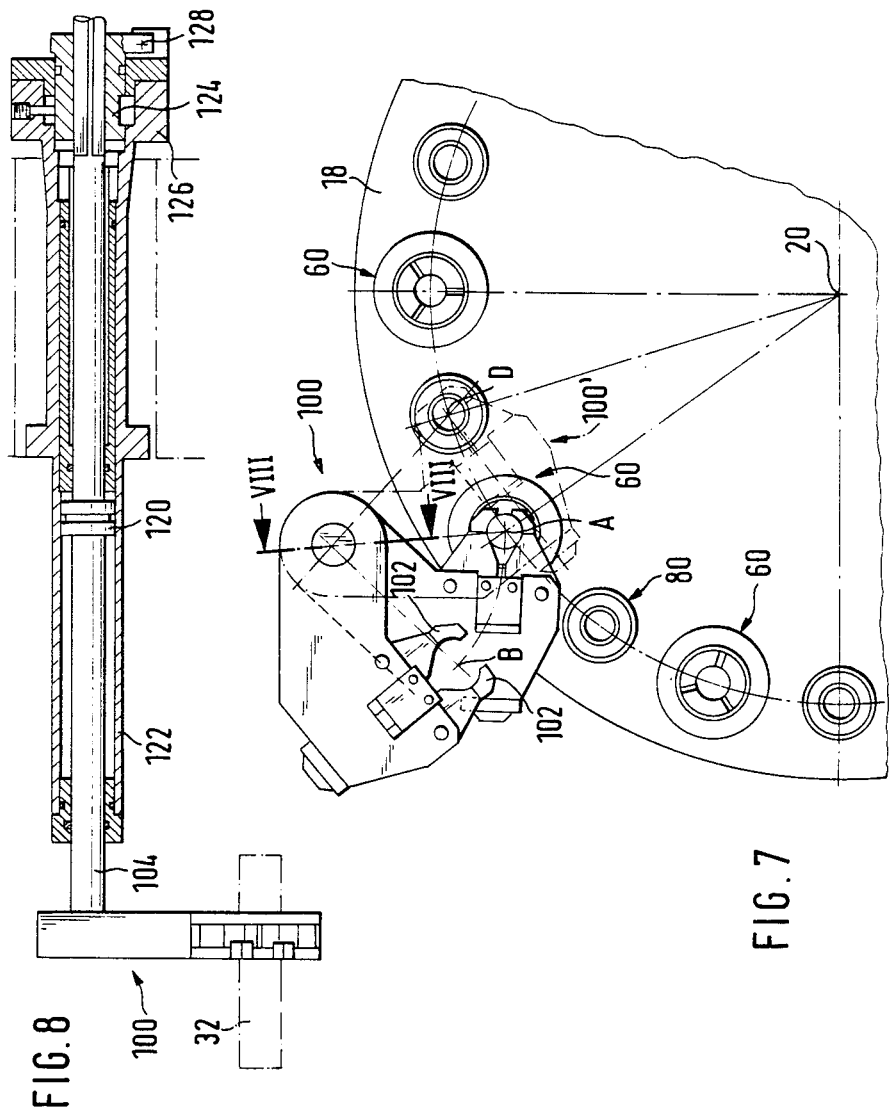
FIG. 7 is a view taken in the direction of the arrow VII in FIG. 6
FIG. 8 is the partial section in the plane VIII—VIII in FIG. 7.

The embodiment, shown in FIGS. 6 to 8, differs from the abovementioned above all in that the work transfer means has, in addition to the gripper 100, a gripper 100' which has basically the same form but is, however, disposed inversely. The gripper 100' is fixed to a gripper shaft 104' which is supported coaxially with the gripper shaft 104 so as to be rotatable and axially slidable but is, however, in contrast to the gripper shaft 104, not at the first head stock 4, but at the second head stock 16. Drive devices are provided for rotation and axial sliding of the two gripper shafts 104 and 104' and said drive devices differ from those described hitherto, in particular from those depicted in FIG. 4, and therefore are described in the following discussion of the gripper shaft 104 with reference to FIG. 8.

According to FIG. 8, the gripper shaft 104 is connected piston-rod-like to a piston 120 which is carried in a double-acting cylinder 122 so as to be axially slidable. Moreover, the gripper shaft 104 is connected with a rotary piston 124 for common rotation and said rotary piston 124 is likewise carried in a double-acting cylinder so as to be rotatable. The field of traverse of the gripper shaft 104 is limited by a stop 128 which is fixed adjustably on the rotary piston 124, for instance at an angle of 45°. In corresponding manner the field of traverse of the gripper shaft 104' is also limited, albeit at a greater angle of, for example, 90°.

The field of traverse of the gripper 100 extends between two transfer positions A and B. In transfer position A, the two jaws 102 of the gripper 100 are disposed symmetrically in relation to the axis of the clamping device 60 which, during a foregoing moving on of the work turret 18, has arrived at a position directly under the axis of the gripper shaft 104. In transfer position A, the gripper 100 is in a position to grasp a workpiece 32 machined on one side, which is in clamping device 60, and to pull it out of this clamping device 60 by axial sliding of the gripper shaft 104. By means of a tilt to 45°, the gripper 100 then arrives in the transfer position B which is situated radially outside the outer rim of the work turret 18.

The field of traverse of the gripper 100' extends between two transfer positions C and D. In transfer position C, the gripper 100' aligns with the gripper 100 which is occupying its transfer position B. As a result, the gripper 100' can take over the workpiece 32, machined on one side, from the gripper 100 by axial sliding of its gripper shaft 104' and can pull this workpiece from the gripper 100 by a reversal of the axial sliding procedure. The gripper 100' is then tilted at 90° from transfer position C to transfer position D in which the axis of the workpiece 32 held in its grip aligns with the axis of the clamping device 80 which is nearest to the gripper shaft 104'. Finally, the gripper 100' only requires to be pushed axially in the direction of the work turret 18 in order to insert the workpiece 32 into the afore-mentioned clamping device 80. As soon as this workpiece 32 has been firmly clamped by this clamping device 80, the gripper 100' is tilted outwards so that it releases the workpiece 32 and cannot obstruct the moving on of the work turret 18.

The embodiment described above with two grippers 100 and 100' is particularly suited for relatively short workpieces which are to be clamped by approximately half of their length by one of the clamping devices 80, so that basically only surfaces which have been machined during a first revolution of the work turret 18, and are to be gripped by one of the clamping devices 80 for a second revolution, are available as working surfaces for the gripper 100.

What is claimed is:

1. In an automatic multiple workpiece turning machine having
   a work turret having means to rotate it by steps around a central axis,
   machining devices, which are disposed around the central axis in a multiplicity of stations,
   a charging device for feeding in workpieces,
   a first group of clamping devices which are disposed on said work turret around and parallel to the central axis, said first group of clamping devices facing the charging device, and each having means to receive and clamp one side of one of the workpieces taken over from said charging device,
   a second group of clamping devices disposed on the side of said work turret which is averted from said charging device, said clamping devices each formed to clamp a machined end of a workpiece,
   work transfer means to remove partially machined workpieces from said first group of clamping devices, and transfer the workpieces to said second group of clamping devices so as to be clamped at their machined ends and subsequently machined at the end which are previously clamped by said first group of clamping devices,
   said work transfer means including at least one gripper and means to move said at least one gripper to and fro between transfer positions on both sides of said turret,
   said means to move said at least one gripper including means to tilt around and displace said gripper along an outer axis, said outer axis being parallel to the central axis, and
   a mounting frame with said work turret mounted for rotation thereon, head stocks on said frame on opposite sides of said work turret with said machining devices mounted on said head stocks, said work transfer means and said charging device being mounted for movement relative to said mounting frame.

2. The automatic turning machine of claim 1 wherein said second group of clamping devices averted from said charging device are disposed in gaps between said first group of clamping devices facing said charging device.

3. The automatic turning machine of claim 1 wherein said second group of clamping devices averted from said charging device are each disposed coaxially with one of said first group of clamping devices facing said charging device.

4. The automatic turning machine of claim 1 wherein
   said clamping devices on either side of said work turret each have one collet enclosed in a clamping sleeve with said collet radially compressable in a resilient manner by axial displacement of said clamping sleeve in which it is enclosed,
   and said second group of clamping devices which are averted from said charging device differing from said first group of clamping devices which are facing said charging device in that their said collets have a smaller inner diameter.

5. The automatic turning machine of claim 4, wherein said clamping sleeves comprise an hydraulically operable piston,
   a control pivot having pressure medium canals therein which is disposed coaxially with said work turret and dependent on the positions of said work turret connected to each of said pistons,
   and at least one additional pressure medium canal in said control pivot associated with said clamping sleeves of said clamping devices averted from said charging device.

6. The automatic turning machine of claim 1, wherein each of said clamping devices on either side of said work turret has an adjustable stop set at a predetermined position for the work piece which is to be clamped, and said stop on each said clamping device averted from said charging device being formed as a hollow guide for a medium used to expel finished workpieces.

7. In an automatic multiple workpiece turning machine having a work turret having means to rotate it by steps around a central axis, machining devices, which are disposed around the central axis in a multiplicity of stations, a charging device for feeding in workpieces, a first group of clamping devices which are disposed on said work turret around and parallel to the central axis, said first group of clamping devices facing the charging device, and each having means to receive and clamp one side of one of the workpieces taken over from said charging device, a second group of clamping devices disposed on the side of said work turret which is averted from said charging device, said clamping devices each formed to clamp a machined end of a workpiece, work transfer means to remove partially machined workpieces from said first group of clamping devices, and transfer the workpieces to said second group of clamping devices so as to be clamped at their machined ends and subsequently machined at the end which are previously clamped by said first group of clamping devices, said work transfer means including a first gripper and means to move said gripper to and fro between a first transfer position on the side of said work turret facing said charging device, and a second transfer position radially outside said work turret, and a second gripper and means to move said gripper to and fro between a third transfer position, which is adjacent to said second transfer position, and a fourth transfer position on the side of said work turret which is averted from said charging device, said means to move each said gripper including means to tilt around and displace said gripper along an outer axis, said outer axis being parallel to the central axis, and a mounting frame with said work turret mounted for rotation thereon, head stock on said frame on opposite sides of said work turret with said machining devices mounted on said head stocks, said work transfer means and said charging device being mounted for movement relative to said mounting frame.

8. The automatic turning machine as claimed in claim 7 wherein two gripper shafts are in mutual alignment, and said two grippers are each fixed to said gripper shaft.

* * * * *